March 29, 1960
J. M. TYLER
2,930,185
EXHAUST NOISE SILENCER
Filed Dec. 13, 1954
3 Sheets-Sheet 1
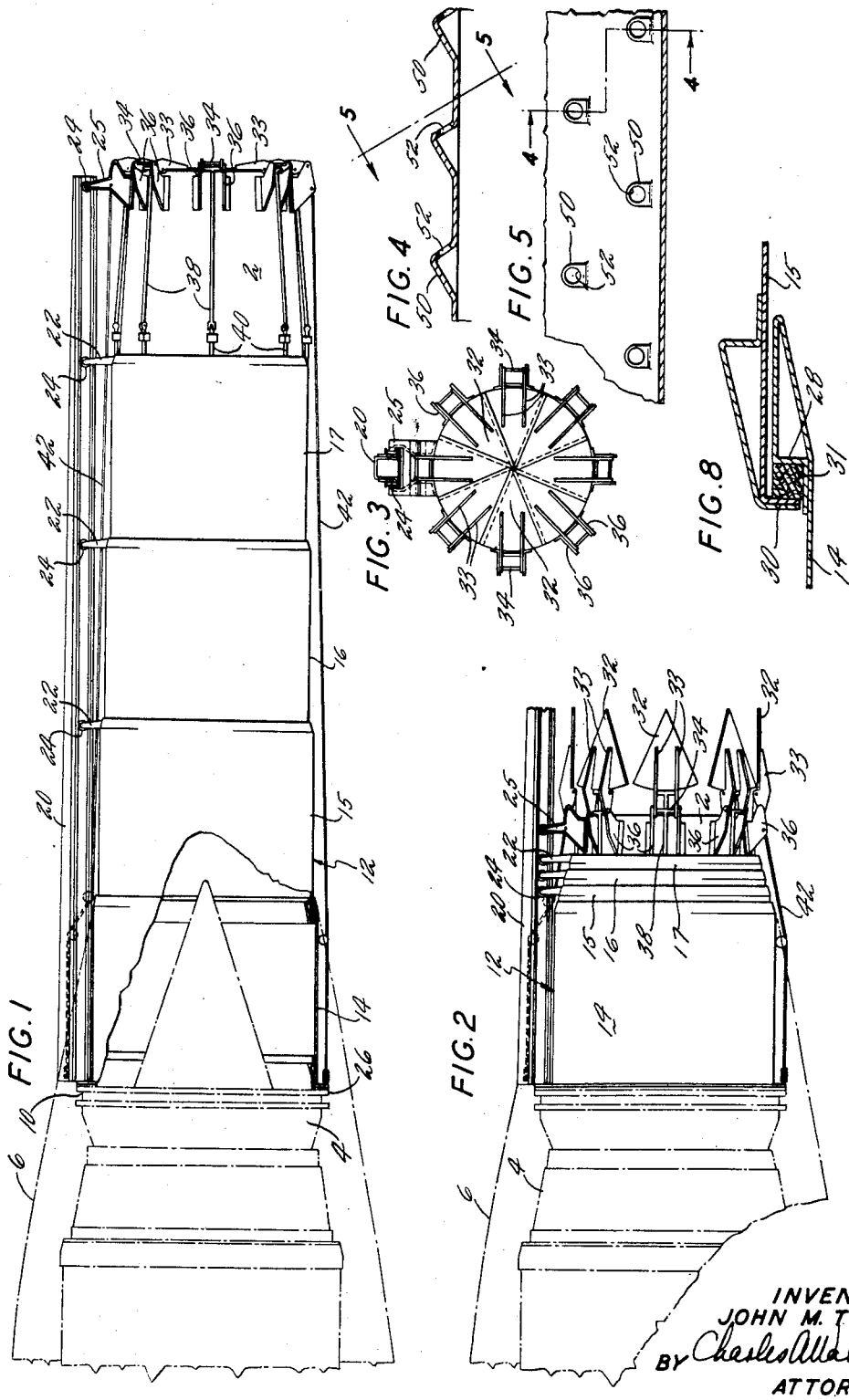
INVENTOR
JOHN M. TYLER
BY Charles A. Warren
ATTORNEY

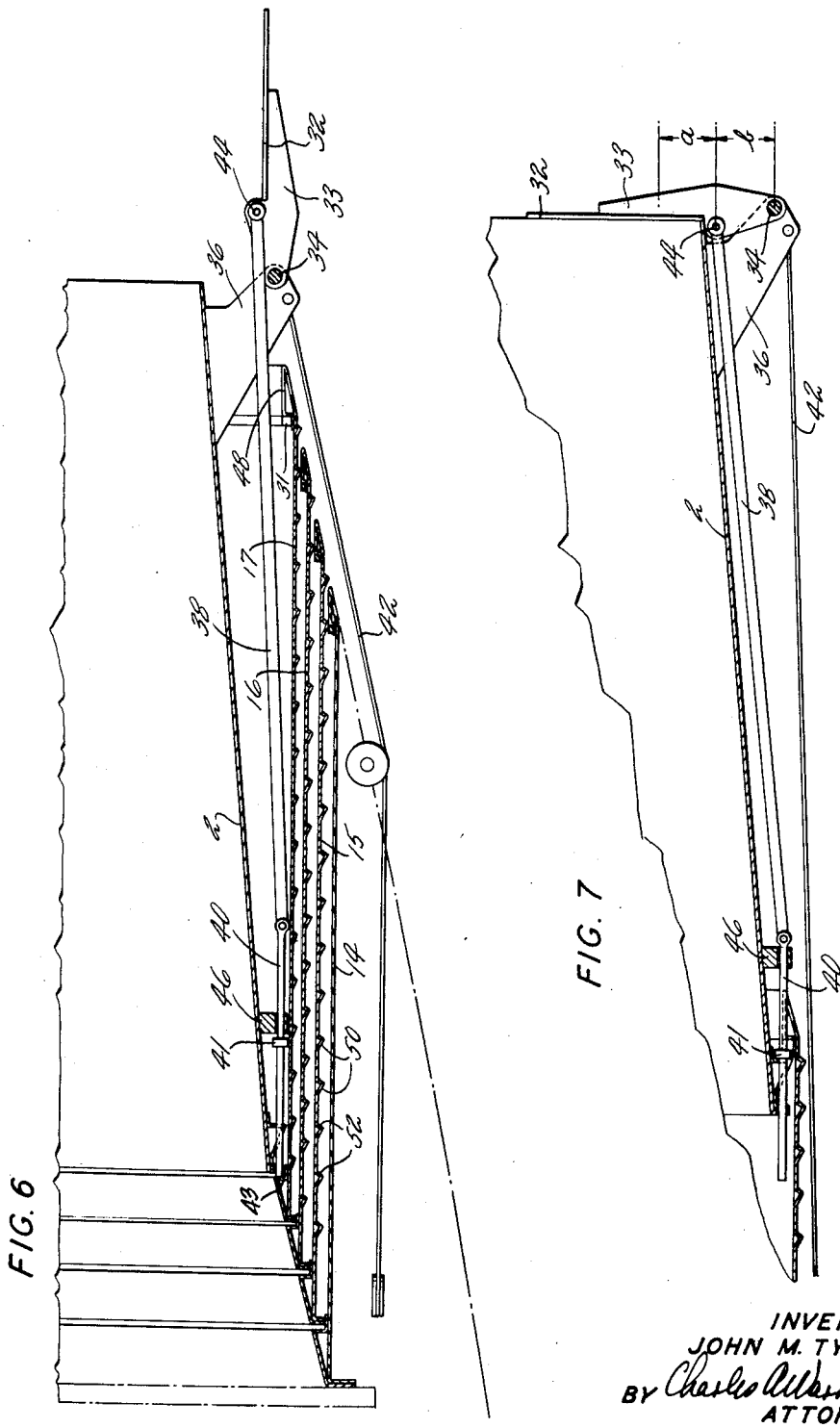

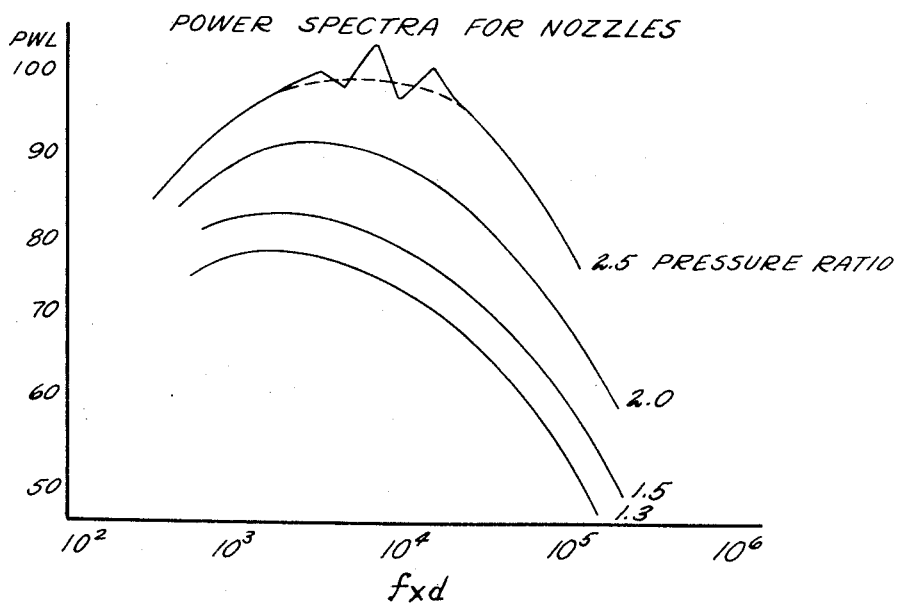

United States Patent Office 2,930,185
Patented Mar. 29, 1960

2,930,185

EXHAUST NOISE SILENCER

John M. Tyler, South Coventry, Conn., assignor to United Aircraft Corporation, East Hartford, Conn., a corporation of Delaware Application December 13, 1954, Serial No. 474,807

14 Claims. (Cl. 60—35.6)

This invention relates to a device for reducing the noise of the propulsive jet issuing from the thrust nozzle of a gas turbine power plant.

One feature of the invention is an arrangement by which the noise level of the jet is reduced especially during the times of operation of the gas turbine power plant that the jet noise is undesirable. Another feature is an arrangement for making the device operative at the times that silencing of the jet noise is desired. Another feature is an arrangement for moving the silencing device into and out of operative position while the power plant is in operation. More specifically, a feature of the invention is an arrangement to convert the normal spectrum of the noise produced by the jet wake to one of higher frequency thereby minimizing the sound from the operating power plant reaching individuals living or working near the power plant.

More particularly, one feature of the invention is a tube projecting rearwardly from the turbine with closure means at the end of the tube and with a large number of small rearwardly directed openings in the walls of the tube through which the gas from the nozzle is discharged. Another feature is a telescopic arrangement of the tube such that it may be moved into inoperative position with an arrangement for opening the closure means.

Other objects and advantages of the invention will be apparent from the specification and claims, and from the accompanying drawings which illustrate an embodiment of the invention.

Fig. 1 is a longitudinal sectional view through the silencing device when in operative position.

Fig. 2 is an elevation view similar to Fig. 1 showing the device in inoperative position.

Fig. 3 is an end view of the device showing the cover.

Fig. 4 is a fragmentary sectional view on a larger scale showing a portion of the perforated wall substantially along line 4—4 of Fig. 5.

Fig. 5 is a sectional view along line 5—5 of Fig. 4.

Fig. 6 is a fragmentary sectional view on a larger scale showing the sleeves and nozzle in telescoped position.

Fig. 7 is a fragmentary sectional view of the nozzle extended to show the closure actuating means.

Fig. 8 is a sectional view of a detail.

Fig. 9 is a diagram of the power spectra for nozzles.

The invention is shown in connection with the exhaust nozzle 2 of a jet engine represented schematically at 4, the engine being positioned within a cowl 6 of an airplane. Engine mounting flanges 10 are engaged by engine mounts, not shown, to hold the engine in position in the airplane.

The silencing device consists of a telescopic tube 12 made up of a series of sleeves 14, 15, 16 and 17 arranged to fit one within the other and which in inoperative position are located around the turbine nozzle 2, as shown in Fig. 2. The nozzle itself also telescopes with the sleeves and is located, when the sleeves are extended, at the downstream end of the set of sleeves, as best shown in Fig. 1. The sleeves are guided by one or more rails 20 supported from the aircraft structure and each of the sleeves 15, 16 and 17 carries at its rearward end a projecting bracket 22 having guide rolls 24 which engage with the rail 20. The nozzle has a similar bracket 25 at its downstream end, as shown in Figs. 1, 2 and 3.

The forward sleeve 14 is attached at its upstream end to a part of the turbine casing as, for example, at the flange 26 to which the exhaust nozzle is generally attached. The downstream end of this sleeve has an inwardly projecting ring 28 (Fig. 8) which engages with a cooperating outwardly projecting flange 30 on the upstream end of the adjacent sleeve 15. The cooperating ring 28 and flange 30 limit the extending movement of the sleeves with respect to each other and provide a connection between adjacent sleeves. Suitable high temperature packing 31 may be placed between the flange and ring to minimize leakage. Similar rings and flanges are provided on each of the sleeves.

The nozzle 2, instead of being cylindrical as are the sleeves, is somewhat convergent as shown and carries at its downstream end a cover shown in detail in Figs. 2 and 3. In the arrangement shown the cover consists of a number of separate segments or flaps 32, each of which covers a portion of the nozzle opening and is attached to arms 33 pivotally mounted on a pin 34 carried by brackets 36 so as to be swung from the operative position of Figs. 1 and 3 into the inoperative or open position of Fig. 2. The segments are moved by any suitable mechanism which may be forwardly extending rods 38 each pinned to a flap at 44 and each having a pin connection at its forward end to an actuating rod 40. Each rod 40 has a collar 41 thereon in a position to engage with the packing 31 on the ring 28 on sleeve 17, as shown in Fig. 7, to hold the flaps closed. When the silencing device is collapsed, the inner end of the actuating rod 40 engages the inwardly extending ring 43 on the upstream end of sleeve 17, as shown in Fig 6, thereby pushing the flaps into the inoperative position of Fig. 6.

When the device is not in use, it may be retracted from the operative position shown in Fig. 1 by pulling the sleeves forward into the inoperative position of Fig. 2 by means of cables 42 connected at their rearward ends to the downstream end of the nozzle and extending forwardly to a suitable winch or other pulling device. When the device is to be extended, the cables are released and the pressure on the walls of the nozzle will extend the device into the position of Fig. 1 also closing the flaps 32 by means of the actuating rods.

The rods may be guided for axial movement by brackets 46 attached to the nozzle duct 2. The ring 28 and packing 31 of sleeve 17 may be notched as shown at 48 in Fig. 6 to permit the brackets 46 to pass through as the device is extended or collapsed, and the collar 41 will be wide enough to bridge the notch in the packing 31.

In order to insure that the nozzle moves rearwardly so that the flaps 32 are completely closed, it will be noted that the rearward acting force on the nozzle must be great enough to overcome the force on the flaps tending to prevent them from being closed. This relationship may be insured by the proper location of the pin 34, Fig. 7, with respect to the pin 44 and the load carrying areas of the flap and the nozzle. This relationship is determined by the axially projected area of the nozzle 2 as compared with the axially projected area of the flaps 32 when closed. In order to insure that the flaps close, the following requirement must be met:

$$b \times A_d > a \times A_c$$

where $a$ is the distance between the center of pressure of each individual flap and the pin connection 44, $A_c$ is the total projected area closed by all of the flaps, $b$ is the distance from the pin 44 to pin 34, and $A_d$ is the projected area of nozzle 2. Thus the product of the distance between the two pivot pins and the projected area of the nozzle must be greater than the product of the flap arm length and the flap area.

To provide for an escape of the gas discharging from the thrust nozzle while the silencer is extended, the walls of the sleeves are provided with protrusions 50 each containing a small exhaust nozzle 52 as shown in detail in Figs. 4 and 5. The nozzles 52 in these rearwardly facing protrusions permit the discharge of gas from within the silencer in such a direction as to produce a forward thrust on the engine. At the same time, the discharge is changed from the single large jet of gas issuing from the conventional nozzle 2 to a large number of small jets of gas issuing from the small nozzles 52.

It has been found that the noise produced when exhaust gas is forced through a jet engine nozzle at high velocity comes primarily from that portion of the jet wake which is appreciably downstream from the nozzle itself. The quantity and quality of the noise produced by the jet wake are functions of the nozzle size, the pressure ratio between the pressure inside and the pressure outside the nozzle, and the temperature of the exhaust gas. The curves in Figure 9 are generalized power spectra for a wide range of nozzle diameters all operating at approximately the same temperature and at the pressure ratios indicated. The irregularities in the curve for a pressure ratio of 2.5 are indications of discrete frequencies in the noise spectrum. These discrete frequencies are produced by shock phenomena in the jet stream immediately downstream from the nozzle. In this plot "$f$" is the frequency in cycles per second, "$d$" is the nozzle diameter in inches, and "PWL" is the noise power level per cycle in decibels referred to $0.9 \times 10^{-13}$ watt.

A study of the curves in Figure 9 will show that if the nozzle diameter is large, the peak of the spectrum occurs at a much lower frequency than is the case when the nozzle diameter is small. For example, the peak of the curve for a pressure ratio of 2.5 occurs at a power level of approximately 100 decibels and at a frequency times diameter of approximately 5000. Dividing the abscissa by nozzle diameter to obtain the frequency at which this peak value occurs, we find that, if the nozzle diameter is 25 inches, the peak frequency occurs at 200 cycles per second. If the nozzle diameter is 0.1 inch, the peak frequency occurs at 50,000 cycles per second.

The upper end of the audible frequency range for most humans is between ten and twenty thousand cycles per second. On the basis of the above the advantage from the noise standpoint of using a large number of 0.1-inch diameter nozzles instead of one 25-inch diameter nozzle will be obvious. A large portion of the noise which is produced by the small nozzles will be above the audible range.

Studies of the noise producing mechanism in jet wakes indicate that the frequency of the noise is a function of the size of the turbulent eddies produced within the jet wakes. Studies of noise from small jet wakes from nozzles arranged in symmetrical patterns close together indicate that, if the nozzles are too close together, the wakes merge allowing the formation of larger eddies and, therefore, more low frequency noise. Thus, in order to take advantage of the spectrum shift indicated in Figure 9, it is necessary that the nozzles have at least a minimum spacing with respect to each other. A spacing of nozzles three diameters apart has been found to give relatively satisfactory results.

Studies of noise produced by large number of small nozzles as compared with a single large nozzle have indicated that the noise level from the small nozzles is even lower than would be predicted from the relationship shown in Figure 9. It has also been found that if the total nozzle area of a large number of small nozzles is the same as the area of one large nozzle, the air flow will be approximately the same and the thrust will be approximately the same as for the one large nozzle.

It is to be understood that the invention is not limited to the specific embodiment herein illustrated and described, but may be used in other ways without departure from its spirit as defined by the following claims.

I claim:

1. The combination with a thrust nozzle having an axis through which a propulsive jet of fluid is discharged, of means in the form of an extensible tube coaxial with and surrounding said nozzle and having a large number of small rearwardly directed thrust nozzles each with an axis coplanar with said tube axis distributed over a major portion of its length and in the wall through which the fluid is discharged, means for extending said tube into an operative position and for moving said thrust nozzle to the downstream end of the tube, and means forming a closure for said nozzle when it is in said downstream position.

2. The combination with a thrust nozzle having an axis through which a propulsive jet of fluid is discharged, of means in the form of a tube coaxial with and positioned around said nozzle and having a large number of small rearwardly directed thrust nozzles each with an axis coplanar with said tube axis therein, means for shifting said thrust nozzle rearwardly to position said nozzle at the downstream end of the tube and expose said small nozzles to said fluid, and means responsive to rearward movement of said nozzle for closing said nozzle.

3. The combination with a thrust nozzle having an axis through which a propulsive jet of fluid is discharged, of means for raising the normal frequency of the sound wave produced by the jet to an inaudible frequency in the form of a tube coaxial with and positioned around said nozzle and having a large number of small rearwardly directed thrust nozzles each with an axis coplanar with said tube axis therein, means for shifting said thrust nozzle rearwardly to position said thrust nozzle at the downstream end of the tube, and closure means for the outer end of said thrust nozzle.

4. The combination with a thrust nozzle having an axis through which a propulsive jet of fluid is discharged, of means in the form of an extensible tube coaxial with and positioned around said nozzle and having a large number of small rearwardly directed thrust nozzles each with an axis coplanar with said tube axis therein, means for shifting said thrust nozzle rearwardly to the downstream end of the tube, and closure means for the outer end of said thrust nozzle, said closure means being movable into and out of operative position.

5. The combination with a thrust nozzle having an axis through which a propulsive jet of fluid is discharged, of means in the form of a tube coaxial with and forming a duct for the fluid to said nozzle, said tube having a large number of small nozzles each with an axis coplanar with said tube axis through which the fluid is discharged, the wall of said tube being provided with protrusions having rearwardly facing wall portions, the small nozzles being in said wall portions, said tube comprising several telescoping sleeves by which the tube may be extensible into operative position, said thrust nozzle being movable to the downstream end of the tube when the sleeves are extended, and means to close said thrust nozzle.

6. The combination with a thrust nozzle having an axis through which a propulsive jet of fluid is discharged, of means in the form of a tube coaxial with and concentric with said nozzle having a large number of rearwardly directed small thrust nozzles each with an axis coplanar with said tube axis therein, means for shifting said thrust nozzle rearwardly to the downstream end of said tube, in which position said nozzle forms an extension of said tube, and closure means for said nozzle movable into nozzle closing position as said nozzle is shifted rearwardly.

7. The combination with a thrust nozzle having an axis through which a propulsive jet of fluid is discharged, of means in the form of a telescopic tube coaxial with and comprising a plurality of sleeves concentric with said nozzle, said sleeves having a large number of rearwardly directed small thrust nozzles each with an axis coplanar with said tube axis therein, means for extending the sleeves of said tube including means for shifting said thrust nozzle rearwardly to the downstream end of said tube, and closure means for said nozzle movable into nozzle closing position as said nozzle is shifted rearwardly.

8. The combination with a thrust nozzle having an axis through which a propulsive jet of fluid is discharged, of means in the form of a tube coaxial with and concentric with said nozzle having a large number of rearwardly directed small thrust nozzles each with an axis coplanar with said tube axis therein, said nozzle being convergent toward its downstream end, whereby it is biased by the fluid jet rearwardly to the downstream end of said tube, closure means for said nozzle, and means for limiting the rearward movement of said nozzle relative to said tube including means for moving said closure means into nozzle closing position.

9. The combination with a thrust nozzle through which a propulsive jet of fluid is discharged, of means in the form of a plurality of concentric sleeves positioned around said nozzle, each having a large number of small rearwardly directed propulsive nozzles therein, means for shifting said nozzle and certain of said sleeves rearwardly into a position in which said tubes are located end to end with said nozzle at the downstream end of the downstream sleeve, means forming a closure for said nozzle, and means responsive to the extension of said nozzle and sleeves for operating said closure means into nozzle closed position.

10. The combination with a thrust nozzle having an axis through which a propulsive jet of fluid is discharged, of means in the form of a tube coaxial with and outside and concentric with said nozzle having a large number of small rearwardly directed thrust nozzles each with an axis coplanar with said tube axis therein, means for shifting said thrust nozzle rearwardly to the downstream end of said tube, in which position said nozzle forms an extension of said tube and said small nozzles are exposed to said propulsive fluid, closure means for said thrust nozzle, means for moving said closure means into said closing position in response to operation of said nozzle shifting means after said nozzle is in its farthest rearward position relative to said tube, means for telescoping said nozzle and tube, and means responsive to operation of said telescoping means for moving said closure means into open position.

11. Noise abatement means for the propulsive jet of fluid discharged from a jet engine having an axis comprising an axial thrust nozzle through which the jet is normally discharged, a tube coaxial with and positioned around said axial nozzle and having a large number of small rearwardly directed thrust nozzles each with an axis coplanar with said tube axis arranged around its circumference and extending along a substantial portion of the length of said tube, means for shifting said axial thrust nozzle between an extended position at the downstream end of said tube in which position said small nozzles are exposed to said fluid jet and a telescoped position within said tube in which the jet stream is directed from the engine directly through said axial nozzle, closure means for said axial nozzle movable into and out of nozzle closing position, and means for moving said closure means into and out of nozzle closing position in response to extending and telescoping movement of said axial nozzle.

12. Mechanism for reducing the noise of the propulsive jet issuing from a gas turbine engine having an axis comprising a tubular thrust nozzle coaxial with said engine and having closure means for its downstream end, a tubular sleeve surrounding said nozzle having in its periphery a plurality of rearwardly directed small thrust nozzles each with an axis coplanar with the axis of said engine which have in the aggregate at least the cross sectional area of said tubular nozzle, said nozzle being movable into an extended position at the downstream end of said tube to expose said small nozzles to said jet, and means for moving said nozzle closure means into closed position in response to movement of said nozzle into extended position, said small nozzles having a cross sectional area sufficiently small to produce a wave frequency which is inaudible.

13. The combination with a thrust nozzle through which a propulsive jet of fluid is discharged, of means in the form of a tube forming a duct for the fluid to said nozzle, said tube having a large number of small nozzles through which the fluid is discharged, the wall of said tube being provided with protrusions having rearwardly facing wall portions, the small nozzles being in said wall portions, closure means for said nozzle, means for telescoping said nozzle into said tube to receive said fluid directly, and means responsive to the telescoping movement of said nozzle for opening said closure means.

14. The combination with a thrust nozzle through which a propulsive jet of fluid is discharged, of means in the form of a tube forming a duct for the fluid to said nozzle, said tube having a large number of small nozzles through which the fluid is discharged, the wall of said tube being provided with protrusions having rearwardly facing wall portions, the small nozzles being in said wall portions, closure means for said nozzle, means for telescoping said nozzle into said tube to receive said fluid directly, means responsive to the telescoping movement of said nozzle for opening said closure means, said nozzle having convergent walls, whereby said nozzle is biased by the jet into an extended position, and means responsive to movement of said nozzle to extend the same for closing said closure means.

References Cited in the file of this patent

UNITED STATES PATENTS

| | | |
|---|---|---|
| 157,548 | Shaw | Dec. 8, 1874 |
| 2,024,834 | Rippe | Dec. 17, 1935 |
| 2,280,835 | Lysholm | Apr. 28, 1942 |
| 2,637,164 | Robson et al. | May 5, 1953 |
| 2,654,215 | Thompson | Oct. 6, 1953 |
| 2,681,548 | Kappus | June 22, 1954 |
| 2,683,347 | Abdo | July 13, 1954 |
| 2,683,961 | Britton et al. | July 20, 1954 |
| 2,685,936 | Brenneman et al. | Aug. 10, 1954 |

FOREIGN PATENTS

| | | |
|---|---|---|
| 56,672 | France | July 23, 1952 |
| 997,262 | France | Sept. 12, 1951 |
| 1,019,198 | France | Oct. 29, 1952 |
| 860,754 | Germany | Dec. 22, 1952 |
| 1,773 | Great Britain | July 6, 1871 |
| 622,348 | Great Britain | Apr. 29, 1949 |
| 664,647 | Great Britain | Jan. 9, 1952 |

UNITED STATES PATENT OFFICE
CERTIFICATE OF CORRECTION

Patent No. 2,930,185                          March 29, 1960

John M. Tyler

It is hereby certified that error appears in the printed specification of the above numbered patent requiring correction and that the said Letters Patent should read as corrected below.

Column 4, line 14, strike out "in the wall".

Signed and sealed this 8th day of November 1960.

(SEAL)

Attest:

KARL H. AXLINE
Attesting Officer

ROBERT C. WATSON
Commissioner of Patents